(12) United States Patent
Pundsack et al.

(10) Patent No.: US 8,584,828 B2
(45) Date of Patent: Nov. 19, 2013

(54) FLEXIBLE RETRACTABLE TRANSFER DEVICE METERING APPARATUS AND METHODS

(75) Inventors: Shawn P. Pundsack, Freeport, MN (US); Timothy D. Wilts, Alexandria, MN (US)

(73) Assignee: Douglas Machine, Inc., Alexandria, MN (US)

( * ) Notice: Subject to any disclaimer, the term of this patent is extended or adjusted under 35 U.S.C. 154(b) by 281 days.

(21) Appl. No.: 12/933,494

(22) PCT Filed: Mar. 31, 2009

(86) PCT No.: PCT/US2009/038920
§ 371 (c)(1),
(2), (4) Date: Sep. 20, 2010

(87) PCT Pub. No.: WO2009/124026
PCT Pub. Date: Oct. 8, 2009

(65) Prior Publication Data
US 2011/0005898 A1 Jan. 13, 2011

Related U.S. Application Data

(60) Provisional application No. 61/041,013, filed on Mar. 31, 2008.

(51) Int. Cl.
*B65G 47/08* (2006.01)
(52) U.S. Cl.
CPC .................................... *B65G 47/08* (2013.01)
USPC ............ 198/429; 198/430; 198/426; 198/600

(58) Field of Classification Search
USPC .......... 198/418.6, 426, 429, 460.2, 600, 430; 53/147, 532
See application file for complete search history.

(56) References Cited

U.S. PATENT DOCUMENTS

| | | | |
|---|---|---|---|
| 2,050,547 A * | 8/1936 | Thayer | 53/154 |
| 4,041,677 A * | 8/1977 | Reid | 53/543 |
| 4,238,024 A | 12/1980 | Hirakawa et al. | |
| 5,667,055 A * | 9/1997 | Gambetti | 198/419.3 |
| 6,843,360 B2 | 1/2005 | Peterman et al. | |
| 7,481,309 B2 * | 1/2009 | Wagner et al. | 198/419.3 |
| 2010/0089721 A1 | 4/2010 | Aronsson et al. | |

\* cited by examiner

*Primary Examiner* — Mark A Deuble
(74) *Attorney, Agent, or Firm* — Alan Kamrath; Kamrath IP Lawfirm, P.A.

(57) ABSTRACT

Product is conveyed as a continuous stream by a meter conveyor (12) unto a transfer plate (32) and a transfer device (42) in the form of a thin piece of flexible material. The transfer device (42) is movable between retracted and extended positions extending over a sweep conveyor (22) by securing its trailing and leading ends to flexible belts (106) on opposite longitudinal sides of the sweep conveyor (22). Product is transferred from the transfer device (42) to the sweep conveyor (22) as the transfer device (42) moves from the extended position to the retracted position and is engaged by a metering bar (52*ba*) which controls the product acceleration on the sweep conveyor (22) and by a sweep bar (62*a*) which collects the product on the sweep conveyor (22). The metering and sweep bars (52*ba*, 62*a*) move independently in the same direction along the same endless path.

22 Claims, 3 Drawing Sheets

FLEXIBLE RETRACTABLE TRANSFER DEVICE METERING APPARATUS AND METHODS

This application is a U.S. national phase application under 35 U.S.C. §371 of International Application No. PCT/US09/38920, filed on Mar. 31, 2009, which claims the benefit under 35 U.S.C. §119(e) of U.S. Provisional Application No. 61/041,013, filed on Mar. 31, 2008.

BACKGROUND

The present invention generally relates to apparatus and methods for metering product from a continuous stream into a product group and/or pack pattern, particularly to metering apparatus and methods not requiring windows between product in the continuous stream, more particularly to metering apparatus and methods which are versatile to meter a wide variety of product such as cans, plastic bottles, jars, cartons, bundles, or trays, and specifically to metering apparatus and methods where product is metered by moving a transfer device from underneath a product group positioned above a sweeping conveyor.

Furthermore, the present invention relates to a metering bar mechanism for registering the leading edge of the product group on the transfer device, with such metering bar mechanism also preventing tipping of tall and/or unstable products. Also, the present invention relates to a sweep bar mechanism for abutting with the trailing edge of the product group moving on a sweep conveyor.

In a typical packaging operation, product comes to a packaging machine in a continuous stream. It is necessary to separate product into groups so that they can be further processed such as being placed into a pack pattern and/or packed into a film overwrap or a corrugated wrap. U.S. Pat. No. 6,843,360 represents one manner of metering product which has enjoyed considerable market success.

However, a need continues to exist for apparatus and methods for metering product which do not suffer from the deficiencies of prior metering apparatus and methods.

SUMMARY OF THE INVENTION

The present invention solves this need and other problems in the field of metering products by providing, in a preferred first aspect, methods and apparatus for moving a transfer device in the form of a thin piece of flexible material between extended and retracted positions relative to a conveyor by pulling upon the leading end when moving to the extended position and by pulling upon the trailing end when moving to the retracted position, with the transfer device being moved independently of the conveyor.

In another preferred aspect of the present invention, the leading edge of product is abutted with a metering bar and the trailing edge of product is abutted with a sweep bar, with the metering and sweep bars independently moving along the same endless path relative to a conveyor.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
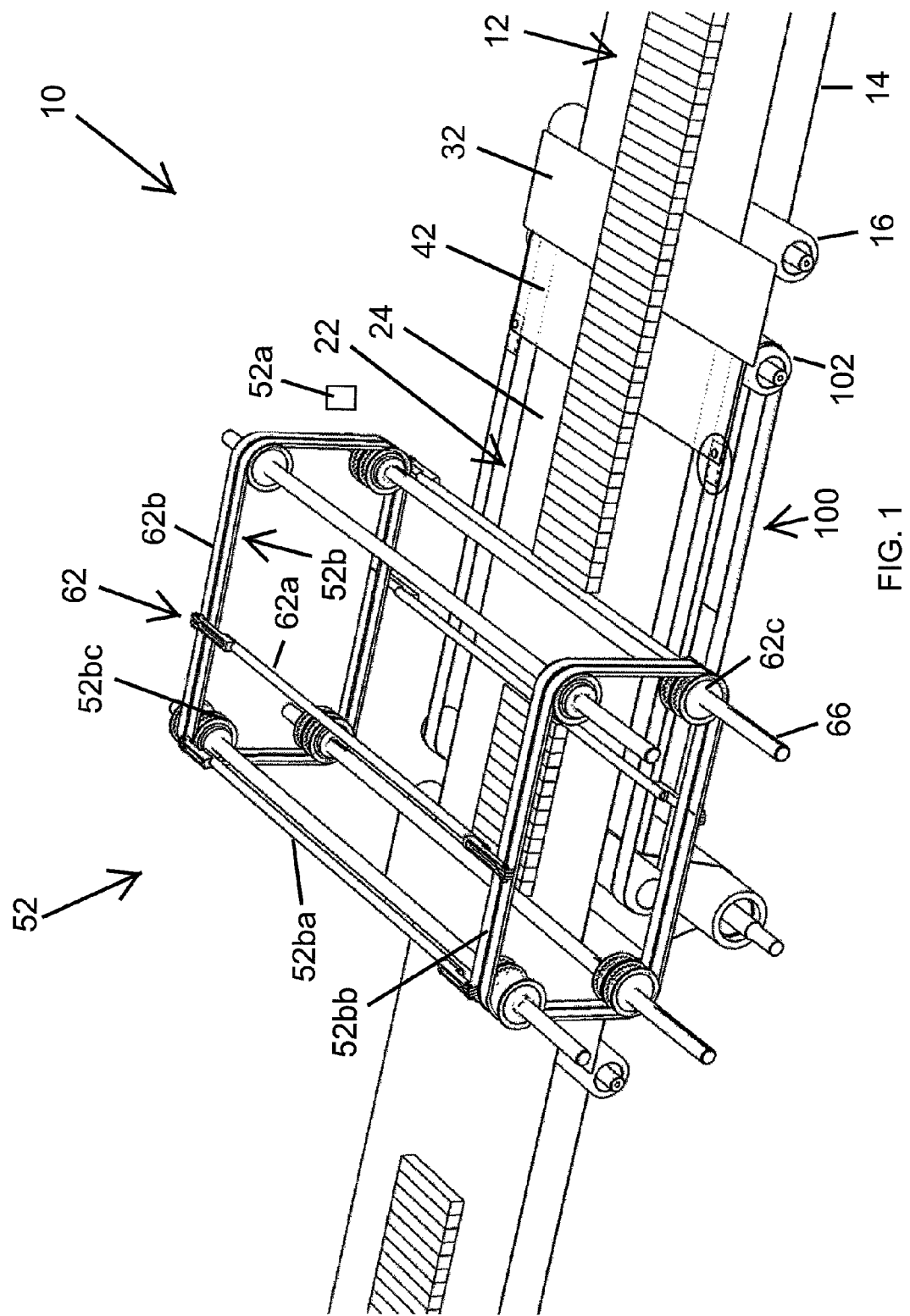
FIG. 1 shows a partial, perspective view of a metering apparatus utilizing preferred methods according to the preferred teachings of the present invention, with portions and product being removed to show constructional details, with the transfer device moving to its retracted position.
Figure 2:
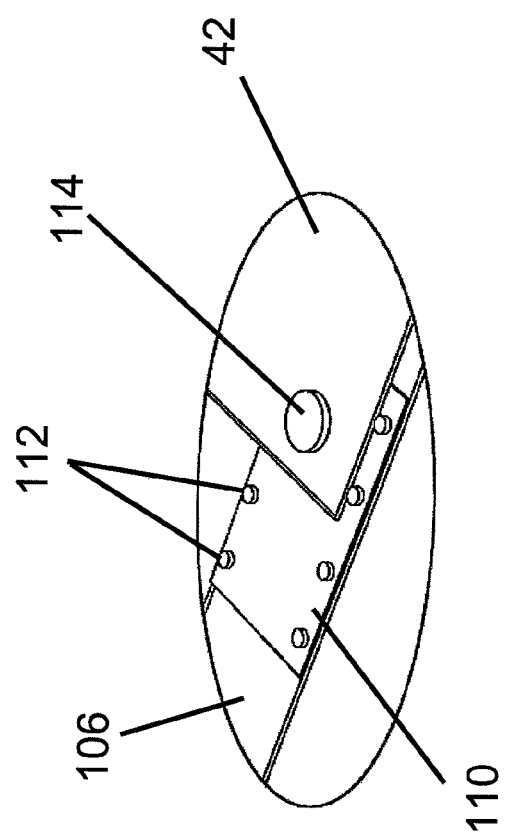
FIG. 2 shows an enlarged perspective view of the area encircled in FIG. 1.
Figure 3:
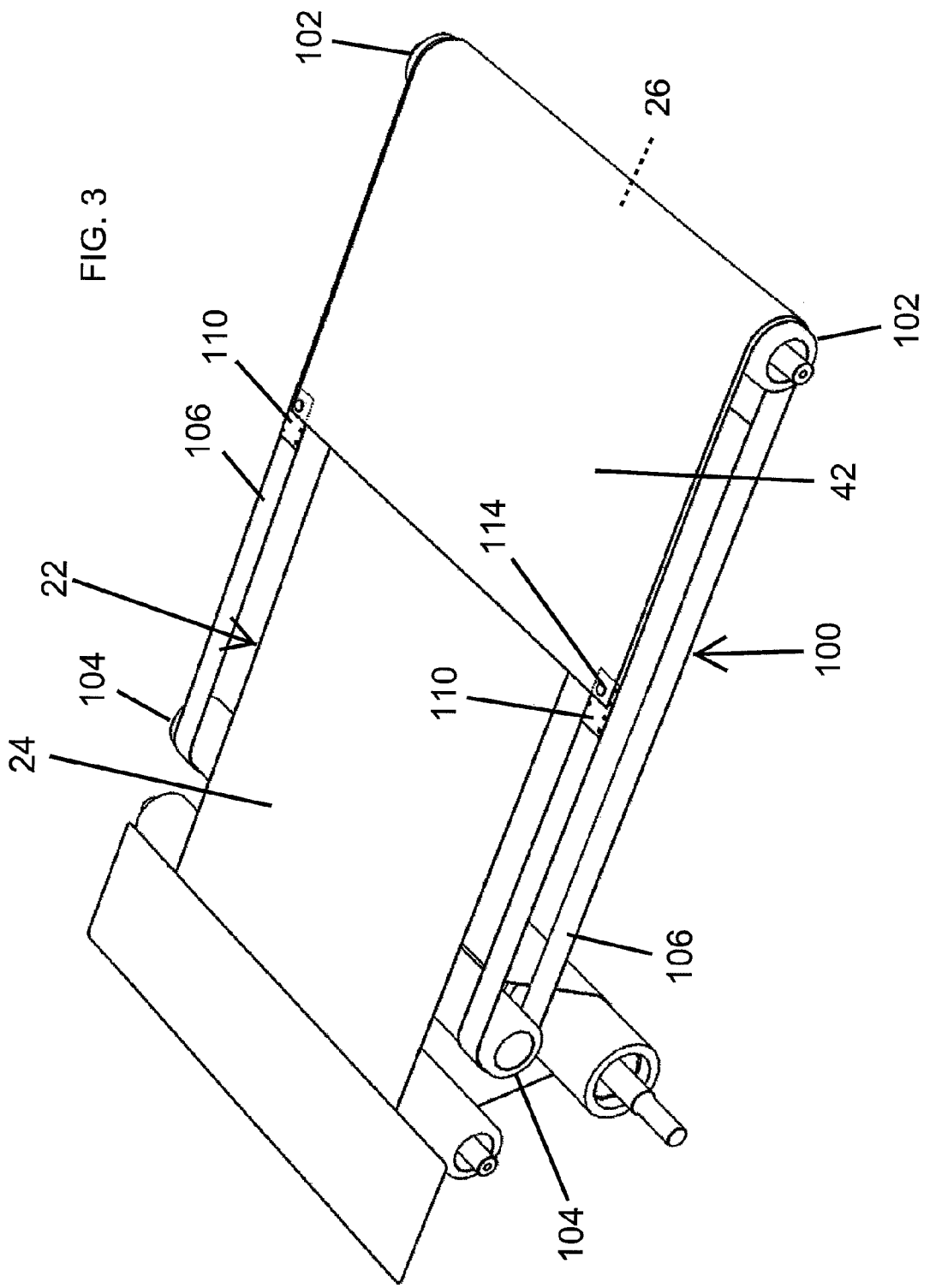
FIG. 3 shows a perspective view of the apparatus of FIG. 1 with portions being removed to show constructional details.

All figures are drawn for ease of explanation of the basic teachings of the present invention only; the extensions of the figures with respect to number, position, relationship, and dimensions of the parts to form the preferred embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "side," "end," "bottom," "first," "second," "laterally," "longitudinally," "row," "column," and similar terms are used herein, it should be understood that these terms have reference only to the structure shown in the drawings as it would appear to a person viewing the drawings and are utilized only to facilitate describing the illustrative embodiments.

DESCRIPTION OF THE PREFERRED EMBODIMENTS

An apparatus for metering product and in particular to apparatus which collates and separates groups of product in preparation for various types of packaging of the most preferred form is shown in the drawings and generally designated 10. Generally, apparatus 10 includes first and second product conveyance mechanisms which are independently driven for moving product in a conveying direction. In the most preferred form, the conveying direction of the first and second product conveyance mechanisms are colinear to each other, with the product being transferred from the first product conveyance mechanism where they are bunched together unto the second product conveyance mechanism where they are separated, typically into groups. However, it should be recognized that the first and second product conveyance mechanisms could have other arrangements including linearly parallel, perpendicular or at a nesting angle of nested product. In the most preferred form, the first product conveyance mechanism is shown as a meter conveyor 12 which is driven at variable speeds such as by a servo motor. In the preferred form, conveyor 12 includes an endless belt 14 including an upper run extending between an upstream roller and a downstream roller 16. It should be realized that conveyor 12 can include one or more additional rollers, with one or more of the rollers 16 being rotated such as by a servo motor to cause movement of belt 14.

In the most preferred form, the second product conveyance mechanism is shown as a sweep conveyor 22 which is separately driven from conveyor 12 and typically in a continuous manner such as by a servo motor. In the preferred form, conveyor 22 includes an endless belt 24 including an upstream end and a downstream end and having an upper run extending between an upstream roller 26 defining the upstream end and a downstream roller. The upper run moves from the upstream end to the downstream end in the conveying direction, and the lower run moves from the downstream end to the upstream end, with at least a portion of the lower run being parallel to and spaced below the upper run. It should be realized that conveyor 22 can include one or more additional rollers, with one or more of the rollers 26 being rotated such as by a servo motor to cause movement of belt 24. In the most preferred form, the upper runs of belts 14 and 24 are in the same plane, and possibly the upper run of belt 24 being parallel to but slightly lower than the upper run of belt 14.

Due to the circular cross sections of rollers 16 and 26 in the most preferred form, a gap is created between belts 14 and 24. In the preferred form, a flat, stationary transfer plate 32 extends between the upper runs of belts 14 and 24 generally between the mid point of rollers 16 and 26. Thus, lead product is pushed by the continuous stream being advanced by conveyor 12 onto and past transfer plate 32 in a manner described hereinafter.

Apparatus 10 according to the teachings of the present invention includes a product transfer device 42 upon which product is supported and in the preferred form has an upper surface of a size upon which the bottom of the product is supported and in the most preferred form to receive product having multiple rows and multiple columns. Transfer device 42 is moveable relative to conveyor 22 between an extended position and a retracted position. Device 42 extends over conveyor 22 in the extended position and in the preferred form also extends over conveyor 22 beyond transfer plate 32 in the retracted position. In the most preferred form, device 42 is in the form of a thin piece of flexible material such as a belt requiring external support to allow product to be supported thereon. Thus, in the preferred form, device 42 in the form of a thin piece of material engages and is supported by belt 24 to allow product to be supported upon device 42.

In the preferred form shown, apparatus 10 further includes a slip sheet drive 100. In particular, drive 100 includes first and second drive pulleys 102 on opposite sides of roller 26 and which are rotatable relative to roller 26. In this regard, roller 26 could be rotatable relative to a common axle defining the rotation axis of the semicircular portion of belt 24 of the upstream end whereas pulleys 102 could be rotatable relative to or rotatably fixed to the common axle, or pulleys 102 could be rotatable relative to the common axle whereas roller 26 could be rotatable relative to or rotatably fixed to the common axle. Drive 100 further includes a drive shaft 104 parallel to but spaced down stream of roller 26, pulleys 102, and their common axle, with drive shaft 104 located between the upper and lower runs of belt 24. First and second, flexible, gear belts 106 extend along an endless course between drive shaft 104 and pulleys 102 and on opposite longitudinal sides of sweep conveyor 22 and parallel to the conveying direction. It should be appreciated that either pulleys 102 or drive shaft 104 or both can be driven such as by a servo motor.

The trailing and leading ends of transfer device 42 are suitably removably fixed at first and second leading points adjacent to the leading end and at first and second trailing points adjacent to the trailing end to gear belts 106, with the first and second leading points being spaced from the first and second trailing points and with the first and second longitudinal sides of conveyor 22 being intermediate the first and second leading points and intermediate the first and second trailing points. In the preferred form shown, each of gear belts 106 includes attachment plates 110 including an array of protrusions 112 extending outwardly thereof. The corners of the trailing and leading ends of transfer device 42 includes an interconnect 114 having a lower surface which removably receives one or more protrusion 112 to secure transfer device 42 to and between gear belts 106. It should be appreciated that both trailing and leading ends of transfer device 42 are attached to gear belts 106 enabling positive movement both up and down stream.

Transfer device 42 is moved from its retracted position to its extended position and independently of conveyor 24 by driving the upper runs of belts 106 in the same direction as the conveying directions of conveyors 12 and 22 and in the most preferred form at the speed of conveyor 22 to pull on the leading end of transfer device 42. Conversely, transfer device 42 is moved from its extended position by driving the lower runs of belts 106 in the same direction as the conveying directions of conveyors 12 and 22 to pull on the trailing end of transfer device 42. The leading end of transfer device 42 located in the conveying direction is at a greater spacing from the upstream end in the extended position than in the retracted position. It should be appreciated that although drive 100 of the preferred form shown is advantageous and produces synergistic results, it should be appreciated that transfer device 42 can be positively moved by securing the trailing and leading ends to drives of other forms and types according to the teachings of the present invention.

Apparatus 10 according to the teachings of the present invention further includes a control device 52 for registering the leading edge of the product group on transfer device 42 in its extended position. In the most preferred form, device 52 includes a photo eye 52a and/or a metering bar mechanism 52b. Basically, photo eye 52a passes a beam of light across sweep conveyor 22 at the location where the leading edge of the product group on transfer device 42 is in its extended position. When one or more product breaks this light beam, the speed of meter conveyor 12 is adjusted or stopped, with drive 100 simply repeating its pattern every cycle in the most preferred form. Thus, photo eye 52a ensures that product is always in the required position when transfer device 42 moves from the extended position to the retracted position and compensates for the potential compressing or inconsistency of product located on device 42.

Metering bar mechanism 52b generally includes a plurality of metering bars 52ba extending laterally across sweep conveyor 22 which are carried along an endless path such as by belts, chains or other flexible transmission device 52bb extending over pulleys 52bc and in the shape of the endless path. Specifically, in a portion of the path, metering bars 52ba move in the conveying direction of conveyor 22 at least initially at the conveyance speed of conveyor 12. Generally, the leading edge of product on sweep conveyor 22 abuts against a respective metering bar 52ba which may serve to prevent tipping of the product upon sweep conveyor 22 as well as to physically restrain product on sweep conveyor 22.

According to the teachings of the present invention, apparatus 10 further includes a mechanism 62 which collects product together and delivers the product to the next appropriate packaging function such as film overwrap or corrugated wrap in a finished form. In the most preferred form, mechanism 62 is a sweeping bar mechanism generally including a plurality of sweep bars 62a extending laterally across sweep conveyor 22 and which are carried along the same endless path of the metering bars 52ba such as by belts, chains or other flexible transmission device 62b extending over pulleys 62c in the shape of the endless path and independently of metering bars 52ba. Generally, sweep bar mechanism 62 introduces sweep bar 62a between product on sweep conveyor 22 for abutting with the trailing edge of product on sweep conveyor 22. As shown in FIG. 1, the metering bar 52ba located in the distance gap between product on sweep conveyor 22 and abutting with the leading edge is spaced in the conveying direction from the sweep bar 62a also located in the distance gap abutting the trailing edge of product.

In the most preferred form shown, mechanisms 52*b* and 62 occupy the same operational footprint and space in apparatus 10. In particular, pulleys 52*bc* and 62*c* include common axles 66, with four such common axles 66 being shown defining a generally rectangular cross sectional shaped endless path. In this regard, on one or more but not all of axles 66, pulleys 52*bc* are rotatably fixed to the common axle 66 which is driven such as by a servo motor, whereas pulleys 62*c* are rotatable with respect to such axle 66. Another one or more but not all of axles 66, pulleys 62*c* are rotatably fixed to the common axle 66 which is driven such as by a servo motor, whereas pulleys 62*c* are rotatable with respect to such axle 66. In the preferred form, transmission devices 52*bb* and pulleys 52*bc* are located inwardly of devices 62*b* and pulleys 62*c*. Metering bars 52*ba* are connected between and driven by devices 52*bb* but do not engage with or are connected to devices 62*b*. Bars 62*a* are connected between and driven by devices 62*b* and extend over devices 52*bb* but are not connected to devices 52*bb*. It should be appreciated that although the manner of moving bars 52*ba* and 62*a* is believed to be advantageous and produces synergistic results, it should be appreciated that bars 52*ba* and 62*a* can be moved in other manners according to the teachings of the present invention.

Now that the basic construction of apparatus 10 according to the preferred teachings of the present invention has been set forth, modes of operation and advantages of apparatus 10 can be explained. Generally, product is fed in a random basis to meter conveyor 12 where it accumulates. In particular, meter conveyor 12 preferably runs constantly but possibly at variable speed, and product is conveyed or pushed thereon. Products can be accumulated on and are conveyed by conveyor 12 as a continuous stream in multiple columns extending laterally across the streams and rows extending longitudinally along the stream or as a lane including a single column and multiple rows in a conveying direction at a first conveyance speed. Additionally, product can have a variety of shapes such as circular or rectangular cross sections. In particular, product can accumulate in a nested manner in the continuous stream on meter conveyor 12 such as in the case of circular cross sections. Nesting of products is very beneficial in apparatus 10 according to the teachings of the present invention as nesting and the lack of physical registration vastly minimizes product surge or in other words the high-pressure effect of one product pushing against another at the point of product release onto transfer device 42.

Products can also accumulate in a non-nested array manner in a single column or lane or in multiple columns. As an example, although the first product conveyance mechanism is shown in the preferred form as a single conveyor 12 in the preferred form, the first product conveyance mechanism could be in the form of parallel, multiple conveyors 12, each conveying a continuous stream of product. Alternatively, the first product conveyance mechanism can be in the form of a single conveyor 12 but with individual lane separator guides being placed over conveyor 12, with such individual lane separator guides being installed permanently or removable and/or adjustable such as by simply being slid to the side for convenient storage for use when desired.

It should be appreciated that in the case of nested or single column product, control device 52 can be in the form of photo eye 52*a* and metering bar mechanism 52*b*, if utilized, functions to prevent tipping of the product upon sweep conveyor 22 and/or controls acceleration of product on sweep conveyor 22 from device 42 to keep product together and precisely located on sweep conveyor 22 as it moves to sweep bars 62*a*. In the case of multiple columns, non-nested packages, control device can be in the form of metering bar mechanism 52*b* which physically registers the leading edges of each of the multiple columns to be the same, with photo eye 52*a* possibly being eliminated.

For the sake of explanation, it will be assumed that device 42 is in its retracted position and product has been advanced by metering conveyor 12 to the free edge of device 42 or transfer plate 32. Device 42 is moved from its retracted position to its extended position such as by moving gear belts 106 such that device 42 moves in the conveying direction of conveyor 22 in the most preferred form at a speed generally equal to conveyor 12 which is less than the speed of conveyor 22. Simultaneously, while device 42 is moved to its extended position, meter conveyor 12 is actuated to move belt 14 to push and thereby transfer product from belt 14 onto transfer plate 32 and onto device 42 in its extended position, with meter conveyor 12 being actuated until photo eye 52*a* senses product in the case of nested or single column product and/or until product engages a metering bar 52*ba*. In the latter case, meter conveyor 12 is actuated so that belt 14 travels a set time or distance corresponding to the desired product pattern depth. Generally, after product has been transferred to device 42, device 42 is moved from its extended position to its retracted position, with the product being removed from device 42 by sliding from device 42 onto sweep conveyor 22 as the upstream product on conveyor 12, transfer plate 32 and device 42 abut with the continuous stream of product upon device 42 and thereby prevent product on device 42 from moving in an upstream direction with device 42 as device 42 moves from the extended position to its retracted position. In fact, in the preferred form where meter conveyor 12 constantly advances product, device 42 begins moving from its extended position towards its retracted position before the product intended to be removed reaches the position over sweep conveyor 22. It should be noted that the distance moved should generally be equal to the desired product pattern depth and specifically a distance so that the last product (s) in the desired group of product are located sufficiently upon belt 24 such that they will travel with belt 24 and thereby are repositioned relative to transfer device 42 by conveyor 22. It should be appreciated that the leading edge of transfer device 42 should be insured to be located between product groups such as electronically by controlling transfer by meter conveyor 12 and/or by controlling drive 100 on the amount that transfer device 42 is moved. Alternately, physical registration adjustment is possible by moving control device 52 and/or transfer device 42.

It should be appreciated that product generally is in the same relationship in the group as in the continuous stream. Specifically, there is generally no separation of product in a direction perpendicular to the conveying direction or in other words between the columns and rows. Such separation occurs in prior pin metering apparatus which requires further alignment or railing to get into a compact group. Apparatus 10 according to the preferred teachings of the present invention releases product onto conveyor 22 in a compact group, eliminating the need for further railing. Additionally, an added benefit is that product in groups seem to be more stable than when product stands individually on conveyor 22. Further, transfer device 42 according to the preferred teachings of the present invention is independently driven from conveyor 22 which is advantageous as undesired slippage of the transfer device relative to the conveyor in prior apparatus could result in the transfer device not reaching the desired extended position. Further, since movement of transfer device 42 is not dependent upon friction with the conveyor 22, transfer device 42 can be formed of more slippery material which takes less energy to move from the extended position to the retracted position and which allows product to more readily slide onto and from transfer device 42 according to the teachings of the present invention.

After product transfer device 42 has reached its retracted position, this operation is repeated after a distance gap has been created on belt 24 between the product group previously traveling with belt 24 and the next product still on device 42 and before device 42 is again moved to its extended position. In the most preferred form, sweep conveyor 22 is moving in the same conveying direction as but at a higher velocity than meter conveyor 12 such that the product pattern is accelerated when moved from device 42 onto sweep conveyor 22 to create the physical separation between the product patterns and the contiguous stream of products on meter conveyor 12. This is beneficial as the velocity of meter conveyor 12 can approach being constant if device 42 can be moved from its extended position to its retracted position and again move towards its extended position as the leading product(s) in the continuous stream of product pass from transfer plate 32 after the previous product has passed onto belt 24.

Once product groups have been placed onto sweep conveyor 22 with physical separations between them, the product in the groups can be collected together and placed in a desired pack pattern, if not already so, such as by the use of metering bars 52ba entering ahead of the product groups on sweep conveyor 22 for delivery to the next appropriate packaging function including sweep bar mechanism 62 and such as but not limited to shrink-packing (film only, film and pad, and/or film and tray), tray loading, cartoning, sleeving or case packing.

It should be appreciated that apparatus 10 according to the teachings of the present invention is advantageous for several reasons. First, it is not necessary for the product to have windows between them in the continuous stream as was necessary with pin type metering. Particularly, apparatus 10 of the present invention can be utilized with product which have windows such as but not limited to cylindrical product, such as but not limited to cans, plastic bottles, and jars, product which do not have windows such as but not limited to rectangular parallelepipeds, such as in cartons and boxes, as well as product in the form of bundles or trays. Thus, apparatus 10 is able to function with many types of product.

In this regard, it may be desired to manufacture device 42 to have a leading edge which is scalloped to have a shape representing the actual shape of the leading bottom edges of the nested pattern of product to be appropriately deposited onto conveyor 22, with the leading bottom edge of product not being linearly straight such as being circular as in the case of many cans, bottles, jars or the like. The advantage of such a scalloped shape is that the leading edge follows the following edge of the last row of the product group and the leading edge of the continuous stream as the following edge has a forward extent forward of the rearward extent of the leading edge due to the nested arrangement which could result in product being haphazardly released from or carried by device 42 if its leading edge were not scalloped. Although it would be necessary to have devices 42 scalloped to each of the potential nested patterns of products desired to be metered, device 42 can be a replacement part which is especially inexpensive when formed of belting or similar thin, flexible material. Additionally, leading edge of device 42 could have other shapes to help removal of product as transfer device 42 moves from its extended position.

Likewise, to change over to product groups having different group depths such as to change between groups having different product sizes or groups having a different number of rows, it is only necessary to adjust the distance that device 42 moves between its extended and retracted position such as by changing the controls to drive 100 in the preferred form, to attach device 42 at a different length to gear belts 106, or to utilize a different device 42 which can be a relatively inexpensive replacement part. Thus, apparatus 10 according to the teachings of the present invention can be rapidly changed between product and pack pattern type and size.

Apparatus 10 according to the teachings of the present invention facilitates electronic registration such as by the use of photo eye 52a. Electronic registration removes forces of physical registration previously required for pin and other prior design metering, which could be sufficiently large to cause product damage. When physical registration is required utilizing apparatus 10 according to the teachings of the present invention, the forces on the product can be managed by controlling build up of product on conveyor 12.

It should be appreciated that apparatus 10 according to the teachings of the present invention is formed of relatively few moving parts, and the only part which would be subjected to wear is device 42, which in the preferred form is a relatively inexpensive replacement part. In particular, conveyors 12 and 22 and metering bar mechanism 52b, if utilized, are low wear and maintenance especially in comparison to the pin metering conveying mechanisms. Additionally, product is open from the top and generally open from the sides during the metering function of apparatus 10 according to the teachings of the present invention to allow easy access to product on conveyor 12 and/or 22. Likewise, apparatus 10 only requires drive 100 in the preferred form within conveyor 22 (and a servo motor to the side) for easy access to the bottom for maintenance and cleaning.

In the most preferred form, conveyor 22 moves at a higher velocity than conveyor 12 so that the product group accelerates from the continuous stream once they are supported directly on conveyor 22. This is advantageous because conveyor 12 can continuously operate without stopping even during the removal of product from transfer device 42 by moving in a direction opposite to the conveying direction of conveyor 12. However, it is possible to have conveyor 12 surge in velocity to transfer product onto device 42 and then decelerate to cause the separation between the metered product group and the continuous stream of product. Likewise, separation could be caused by other techniques including but not limited to combinations of the above.

It should be appreciated that metering bar mechanism 52b performs an additional function according to the preferred teachings of the present invention. Specifically, in the most preferred form, conveyor 22 moves at a velocity greater than the velocity of product before it is transferred onto conveyor 22. As a result, product on conveyor 22 will separate from product still located upon transfer device 42 in the form shown to cause a physical separation therebetween if product was free to accelerate with conveyor 22. Basically, lead product on conveyor 22 initially contacts one of metering bars 52ba generally when transfer device 42 begins moving from its extended position. As metering bars 52ba travel generally at the velocity of product on transfer device 42, metering bars 52ba control the acceleration of product to be less than conveyor 22 so that separation within the group of product does not occur. Once the entire group of product has been transferred from transfer device 42 onto conveyor 22, metering bars 52ba can be accelerated to match the velocity of conveyor 22 or can be slid away from the leading product on conveyor 22 such that product on conveyor 22 is allowed to accelerate to match the speed of conveyor 22.

As set forth previously, apparatus 10 according to the teachings of the present invention allows nesting in the continuous stream which is very desirable. Thus, when separated into groups, product will be nested or will not be in the same physical relationships to each other as when they were in the continuous stream as variations in slippage between individual product in the group and conveyor 22. However, many packaging operations require the product group to be in an arranged pack pattern. According to the teachings of the present invention, metering bars 52*ba* travel at a velocity slower than conveyor 22 and are in front of the product group to thereby limit acceleration of product. As a result, the product in group will slide on conveyor 22 (possibly with the help of side rails) relative to each other so that they will be located in an arranged pack pattern suitable for further packaging functions when engaged by sweep bars 62*a*. It should be realized where product is in an arranged pattern and electronic registration is possible using only photo eye 52*a*, where product does not have to be in a particular pattern, or the like, metering bar mechanism 52*b* could be simply removed, such as by sliding to a noninterfering position above conveyor 22.

Now that the basic teachings of the present invention have been explained, many extensions and variations will be obvious to one having ordinary skill in the art. For example, although apparatus 10 of the most preferred form includes the combination of several, unique features believed to obtain synergistic results, apparatus could be constructed according to the teachings of the present invention including such features singly or in other combinations.

Additionally, it can be appreciated that conveyor 22 could be arranged to receive a tray or a pad before transfer device 42 is extended thereover or product transferred onto conveyor 22 according to the teachings of the present invention.

The function of plate 32 is to allow product to be transferred from conveyor 12 to conveyor 22. However, it can be appreciated that this function can be accomplished in other manners as well known in the packaging art including but not limited to by the use of roller mechanisms, reshaping conveyors 12 and/or 22, or by utilizing other manners of product conveyance mechanisms. As an example, another possibility is using a moving conveyor transfer that consists of the tail shaft of sweep conveyor 22 and the head shaft of meter conveyor 12 having a fixed relationship to each other and which can laterally position itself (such as via a servo motor) underneath the appropriate product separation point and then in combination with metering bars 52*ba* advance the desired arrangement of product to conveyor 22.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Apparatus for metering product comprising, in combination: a conveyor having an upstream end and a downstream end and including an upper run moving from the upstream end to the downstream end in a conveying direction and a lower run moving from the downstream end to the upstream end; a transfer device comprising a thin piece of flexible material and having a leading end and a trailing end; and a drive moving the transfer device relative to the conveyor between an extended position and a retracted position, with the leading end located on the upper run of the conveyor in the conveying direction at a greater spacing from the upstream end in the extended position than in the retracted position, with the transfer device being moved from the extended position to the retracted position by the drive pulling the trailing end, with the transfer device being moved from the retracted position to the extended position by the drive pulling the leading end and independently of movement of the upper run of the conveyor.

2. The apparatus of claim 1 wherein the conveyor includes first and second longitudinal sides extending parallel to the conveying direction; and with the drive secured to the transfer device at first and second leading points adjacent to the leading end and at first and second trailing points adjacent to the trailing end, with the first and second longitudinal sides being intermediate the first and second leading points and being intermediate the first and second trailing points, with the first and second leading points being spaced from the first and second trailing points.

3. The apparatus of claim 2 wherein the drive includes first and second flexible belts parallel to the conveying direction, with the first leading and trailing points being on the first flexible belt and with the second leading and trailing points being on the second flexible belt.

4. The apparatus of claim 3 wherein the first and second flexible belts are each arranged along an endless course.

5. The apparatus of claim 4 wherein the upper run and lower run are parallel, with the upstream end being semicircular around an axle, with the axle including first and second pulleys, with the apparatus further comprising, in combination: a shaft spaced from and parallel to the axle and extending between the upper and lower runs, with the first and second flexible belts extending around the shaft and the first and second pulleys.

6. The apparatus of claim 5 further comprising, in combination: a metering bar moving in an endless path above the conveyor; and a sweep bar moving in the endless path independently from the metering bar.

7. The apparatus of claim 3 wherein the upper run and lower run are parallel, with the upstream end being semicircular around an axle, with the axle including first and second pulleys, with the apparatus further comprising, in combination: a shaft spaced from and parallel to the axle and extending between the upper and lower runs, with the first and second flexible belts extending around the shaft and the first and second pulleys.

8. The apparatus of claim 7 further comprising, in combination: a metering bar moving in an endless path above the conveyor; and a sweep bar moving in the endless path independently from the metering bar.

9. The apparatus of claim 1 further comprising, in combination: a metering bar moving in an endless path above the conveyor; and a sweep bar moving in the endless path independently from the metering bar.

10. The apparatus of claim 9 further comprising, in combination: first and second, flexible, metering transmission devices in the shape of the endless path and parallel to the conveying direction, with the conveyor located intermediate the first and second, flexible, metering transmission devices, with the metering bar secured to and extending between the first and second, flexible, metering transmission devices; and first and second, flexible, sweep transmission devices in the shape of the endless path and parallel to the conveying direction, with the conveyor located intermediate the first and second, flexible, sweep transmission devices, with the sweep bar secured to and extending between the first and second, flexible, sweep transmission devices.

11. The apparatus of claim 10 further comprising, in combination: a plurality of axles each defining an axis, with each axle including first and second metering pulleys rotatable about the axis and receiving the first and second, flexible metering transmission devices, with the conveyor located intermediate the first and second metering pulleys, with each axle further including first and second sweep pulleys rotatable about the axis and receiving the first and second, flexible, sweep transmission devices, with the conveyor located intermediate the first and second sweep pulleys.

12. Method for metering product comprising:
providing a conveyor including an upper run moving in a conveying direction;
pulling in the conveying direction a leading end of a transfer device comprising a thin piece of flexible material to an extended position from a retracted position, with the transfer device extending over the upper run of the conveyor in the extended position;
transferring product from a continuous stream unto the transfer device in the extended position;
pulling a trailing end of the transfer device from the extended position to the retracted position with product transferred thereon being transferred to the upper run of the conveyor; and
conveying the product transferred on the conveyor and in the conveying direction as the transfer device is pulled from the extended position to the retracted position, with pulling of the leading and trailing ends of the transfer device being independent of the upper run of the conveyor.

13. The method of claim 12 wherein pulling the leading end comprising moving a drive secured to the transfer device at first and second leading points adjacent the leading end and at first and second trailing points adjacent the trailing end, with the conveyor including first and second longitudinal sides extending parallel to the conveying direction, with the first and second longitudinal sides being intermediate the first and second leading points and being intermediate the first and second trailing points, with the first and second leading points being spaced from the first and second trailing points.

14. The method of claim 13 wherein moving the drive comprises moving first and second flexible belts parallel to the conveying direction, with the first leading and trailing points being on the first flexible belt and with the second leading and trailing points being on the second flexible belt.

15. The method of claim 14 wherein moving the first and second flexible belts comprises moving the first and second flexible belts along an endless course.

16. The method of claim 14 wherein conveying on the conveyor comprises moving a belt passing concentrically around an axis to define an upper run and a lower run parallel to and spaced from the upper run, with the upper run moving in the conveying direction, with moving the first and second belts comprising moving the first and second belts around first and second pulleys rotatable about the axis and a shaft spaced from and parallel to the axis and extending between the upper and lower runs.

17. The method of claim 12 further comprising:
abutting a leading edge of the product with a metering bar before the transfer device is pulled from the extended position;
accelerating the metering bar in an endless path to be spaced from the product after the transfer device is pulled from the extended position;
abutting a trailing edge of the product with a sweep bar while the product received from the transfer device is being conveyed; and
moving the sweep bar in the endless path of the metering bar independently from the metering bar after abutting the trailing edge.

18. The method of claim 17 wherein moving the metering bar comprising:
moving first and second, flexible, metering transmission devices in the shape of the endless path and parallel to the conveying direction, with the product located intermediate the first and second, flexible, metering transmission devices, with the metering bar secured to and extending between the first and second, flexible, metering transmission devices; and
wherein moving the sweep bar comprises moving first and second, flexible, sweep transmission devices in the shape of the endless path and parallel to the conveying direction, with the product located intermediate the first and second, flexible, sweep transmission devices, with the sweep bar secured to and extending between the first and second, flexible, sweep transmission devices.

19. The method of claim 18 further comprising:
providing a plurality of axles each defining an axis, with each axle including first and second metering pulleys rotatable about the axis and receiving the first and second, flexible metering transmission devices, with the conveyor located intermediate the first and second metering pulleys, with each axle further including first and second sweep pulleys rotatable about the axis and receiving the first and second, flexible, sweep transmission devices, with the conveyor located intermediate the first and second sweep pulleys.

20. Method for metering product comprising:
creating a distance gap between a product group and product moving in a conveying direction, with the product group having a trailing edge and the product having a leading edge;
entering a sweep bar into the distance gap;
entering a metering bar into the distance gap with the sweep bar;
abutting the trailing edge of the product with the sweep bar;
abutting the leading edge of the product with the metering bar moving at a first speed with the metering bar located in the distance gap and abutting with the leading edge being spaced in the conveying direction from the sweep bar abutting the trailing edge, with abutting the leading edge comprising moving the metering bar along an endless path, with abutting the trailing edge comprising moving the sweep bar independently of the metering bar along a same endless path as of the metering bar; and
accelerating the metering bar to be spaced from the leading edge of the product moving in the conveyance direction at a second speed greater than the first speed.

21. The method of claim 20 wherein moving the metering bar comprising:
moving first and second, flexible, metering transmission devices in the shape of the endless path and parallel to the conveying direction, with the product located intermediate the first and second, flexible, metering transmission devices, with the metering bar secured to and extending between the first and second, flexible, metering transmission devices; and
wherein moving the sweep bar comprises moving first and second, flexible, sweep transmission devices in the shape of the endless path and parallel to the conveying direction, with the product located intermediate the first and second, flexible, sweep transmission devices, with the sweep bar secured to and extending between the first and second, flexible, sweep transmission devices.

22. The method of claim 21 further comprising:
providing a plurality of axles each defining an axis, with each axle including first and second metering pulleys rotatable about the axis and receiving the first and second, flexible metering transmission devices, with the conveyor located intermediate the first and second metering pulleys, with each axle further including first and second sweep pulleys rotatable about the axis and receiving the first and second, flexible, sweep transmission devices, with the conveyor located intermediate the first and second sweep pulleys.

* * * * *